US005389190A

United States Patent [19]

Larsen et al.

[11] Patent Number: 5,389,190

[45] Date of Patent: Feb. 14, 1995

[54] APPARATUS AND METHOD FOR APPLYING A TWIST-TIE TO A PACKAGING CONTAINER

[75] Inventors: Brian D. Larsen, Worthington; James A. Beckman, Reading; Stan W. Drietz, Worthington; Scott L. Nelson, Worthington; Mike P. Feltman, Worthington; Gary L. Lowe, Worthington, all of Minn.

[73] Assignee: Bedford Industries, Inc., Worthington, Minn.

[21] Appl. No.: 277,359

[22] Filed: Jul. 19, 1994

Related U.S. Application Data

[63] Continuation of Ser. No. 34,350, Mar. 19, 1993, abandoned.

[51] Int. Cl.[6] .............................................. B32B 31/00

[52] U.S. Cl. .................................... 156/521; 156/567; 198/690.1; 221/212; 271/901

[58] Field of Search ................. 83/221, 222, 257, 259, 83/261; 221/212, 217; 226/35; 271/307, 311, 18.1, 18.2, 275, 901; 198/690.1; 156/517, 521, 566, 567

[56] References Cited

U.S. PATENT DOCUMENTS

| | | | |
|---|---|---|---|
| 1,741,848 | 12/1929 | Kelly | 271/307 X |
| 2,266,087 | 12/1941 | Schlemmer | 156/521 |
| 2,721,669 | 10/1955 | Keely | 83/261 X |
| 3,138,904 | 6/1964 | Burford | 53/417 |
| 3,177,750 | 4/1965 | Ameyimo | 83/261 X |
| 3,339,915 | 9/1967 | Ricard | 271/18.2 |
| 3,754,635 | 8/1973 | Mojden | 198/690.1 |
| 3,825,039 | 7/1974 | Crabb | 140/93 A |
| 3,890,190 | 6/1975 | Eburn, Jr. | 156/521 |
| 3,895,989 | 7/1975 | Lucas | 156/265 |
| 3,919,829 | 11/1975 | Burford et al. | 53/135 |
| 3,970,117 | 7/1976 | Zamansky et al. | 140/93 A |
| 4,138,102 | 2/1979 | Palmer | 271/901 X |
| 4,189,900 | 2/1980 | Platt, Jr. | 53/583 |
| 4,409,872 | 10/1983 | Bertoldo | 83/155 |
| 4,420,355 | 12/1983 | Saur | 156/250 |
| 4,490,960 | 1/1985 | Klemesrud | 53/135 |
| 4,559,766 | 12/1985 | Matsushita | 53/586 |
| 4,559,977 | 12/1985 | Dilley | 140/93.6 |
| 4,586,412 | 5/1986 | Johnson | 83/205 |
| 4,655,264 | 4/1987 | Dilley | 140/93.6 |
| 4,660,351 | 4/1987 | Saitoh | 53/417 |
| 4,730,434 | 3/1988 | Knudsen | 53/67 |
| 4,797,313 | 1/1989 | Stolk et al. | 428/156 |
| 4,907,392 | 3/1990 | Knudsen | 53/138 |
| 4,913,560 | 4/1990 | Herrington | 383/71 |
| 5,044,775 | 9/1991 | Rutledge | 383/72 |
| 5,045,042 | 9/1991 | Rutledge | 493/225 |
| 5,121,682 | 6/1992 | Parker et al. | 100/26 |

*Primary Examiner*—David A. Simmons

*Assistant Examiner*—James J. Engel

[57] ABSTRACT

An apparatus for applying a twist-tie to a multiple serving, recloseable, flexible packaging container including a payout mechanism for holding a supply of twist-tie material. An extracting and cutting mechanism is configured to extract a continuous length of twist-tie material from the supply of twist-tie material and cut a twist-tie of a desired length. A magnetic application mechanism produces a magnetic force sufficient to remove the twist-tie (at least a portion of which is metallic) from the extracting and cutting mechanism. A dispensing mechanism dispenses a hot melt adhesive material on the twist-tie held by the magnetic application mechanism. The magnetic application mechanism then applies the twist-tie to a surface of a container. The adhesive material acts to secure the twist-tie to the container.

20 Claims, 8 Drawing Sheets

APPARATUS AND METHOD FOR APPLYING A TWIST-TIE TO A PACKAGING CONTAINER

This is a continuation of application Ser. No. 08/034,350, filed Mar. 19, 1993, now abandoned. Priority of the prior application is claimed pursuant to 35 USC § 120.

BACKGROUND OF THE INVENTION

The present invention relates generally to packaging containers. In particular, the present invention is an apparatus and method for applying a twist-tie to a multiple serving, recloseable, flexible packaging container.

At one time, multiple serving, flexible packaging containers, such as those that hold cookies, nuts or coffee, were reclosed by simply rolling down the open top of the container. However, this reclosing method was sometimes found to be insufficient, because it did not adequately seal the container. The inadequate sealing of the container would allow air to enter the container thereby drying out the food product. The air entering the container soon caused the food contents to go stale, thus ruining the freshness and flavor of the packaged food.

Separate "twist-ties", made of either plastic and wire or paper and wire, have also been used to seal recloseable, flexible packaging containers. To use a separate twist-tie, the open top of the container is simply twisted to form a necked down region. The twist-tie is then wrapped about the necked down region and the ends of the twist-tie are twisted about one another to secure the twist-tie about the container. The thus applied twist-tie prevents the open top of the container from untwisting, and thereby better maintains the freshness and flavor of the food by preventing substantial quantities of air from reaching the packaged food contents. However, if the open top of the container is not tightly twisted and the twist-tie is not applied tightly, the food contents of the container can still become stale over time. In addition, a separate twist-tie is often not readily handy when one wants to reclose a multiple serving packaging container.

As such, twist-tie applicators have been developed to secure a twist-tie to a multiple serving, recloseable, flexible packaging container such that the twist-tie is readily handy when one wants to reclose the container. To reclose the container, the open top edge of the container is rolled down about the twist-tie and the tabs of the twist-tie extending past the side edges of the bag are bent over to prevent the container top edge from unrolling. A thus reclosed container prevents air from reaching the packaged food contents and thereby maintains the freshness and flavor of the food contents.

The U.S. Pat. No. 4,420,355 to Saur discloses one such apparatus for applying a twist-tie to a packaging container. The apparatus includes an accumulator part, a feed part, and a cutting and presenting part. The accumulator part has a movable idler pulley activated by a first pneumatic cylinder. Movement of the idler pulley causes accumulation of a length of uncut twist-tie material. The accumulated twist-tie material is then fed by feed rollers of the feed part through a directional guide. Movement of a cut and seal applicator of the cutting and presenting part, via a second pneumatic cylinder, cuts the twist-tie material to a desired twist-tie length and applies the twist-tie to a thermoplastic bag. The twist-tie is secured to the bag by a heater element that heats the bag prior to the application of the twist-tie to the bag. Upon contact of the twist-tie with the bag the twist-tie becomes thermally adhered to the bag. Because the applicator of Saur relies on the movement of the cut and seal applicator to hold the twist-tie to the applicator, twist-ties may be applied to bags at various undesired and misaligned orientations.

Individual twist-ties having pressure sensitive adhesive on one side thereof are also available. However, these twist-ties are applied to flexible packaging containers by hand. Because of the hand work nature of the application of the twist-ties, the twist-ties are usually adequately aligned on the containers, however, the application process is tedious, cumbersome and time consuming.

There is a need for an apparatus and a method for applying a twist-tie to a multiple serving, recloseable, flexible packaging container that is efficient and uncomplicated. Specifically, the application apparatus should permit twist-ties to be applied to packaging containers quickly and with alignment accuracy while minimizing the often cumbersome and tedious hand work.

SUMMARY OF THE INVENTION

The present invention is an apparatus and method for applying a twist-tie to a surface of a container. The application apparatus includes a payout mechanism coupled to a frame assembly. The payout mechanism is configured to hold a supply of twist-tie material. An extracting and cutting mechanism is coupled to the frame assembly and is adapted to extract a continuous length of twist-tie material from the supply of twist-tie material and cut a twist-tie of a desired length. An application mechanism removes the twist-tie from the extracting and cutting mechanism and applies the twist-tie to a surface of a container.

The extracting and cutting mechanism includes a powered drive roller over which the continuous length of twist-tie material passes. A feed arm assembly of the extracting and cutting mechanism has a pivotable lever arm having a rotatable feed roller. A pneumatic actuating mechanism is coupled to the lever arm to move the lever arm between a first position, wherein the feed roller is immediately adjacent the drive roller and in contact with the continuous length of twist-tie material to cause the feed roller to extract twist-tie material from the payout mechanism, and a second position wherein the feed roller is spaced from the drive roller and no extraction of twist-tie material occurs.

The pivotable lever arm further includes a cutoff knife movable with the lever arm upon initiation of the actuating mechanism. The cutoff knife has a retracted state wherein the cutoff knife is spaced from the continuous length of twist-tie material and an extended state wherein the cutoff knife contacts the continuous length of twist-tie material to cutoff the twist-tie of desired length. The retracted state of the cutoff knife corresponds to the first position of the lever arm, while the extended state of the cutoff knife corresponds to the second position of the lever arm.

The application mechanism includes a spring biased pressure roller and a powered, rotatable, magnetic disc which in combination produce sufficient force to remove the twist-tie (at least a portion of which is metallic) from the extracting and cutting mechanism and hold the twist-tie to the magnetic disc. Rotation of the magnetic disc carries the twist-tie past a dispensing mechanism. The dispensing mechanism is configured to dispense a hot melt adhesive material on to at least a portion of the twist-tie. Further rotation of the magnetic disc effects application of the twist-tie to the surface of the container. The adhesive material acts to secure the twist-tie to the surface of the container. The container is moved relative to the magnetic disc via a conveyor assembly.

This application apparatus and method of application are relatively uncomplicated. The application apparatus and method allows twist-ties of desired lengths having desired adhesive lengths to be applied to containers of varying sizes quickly and efficiently while insuring alignment accuracy.

DETAILED DESCRIPTION OF THE PREFERRED EMBODIMENTS

Figure 1:
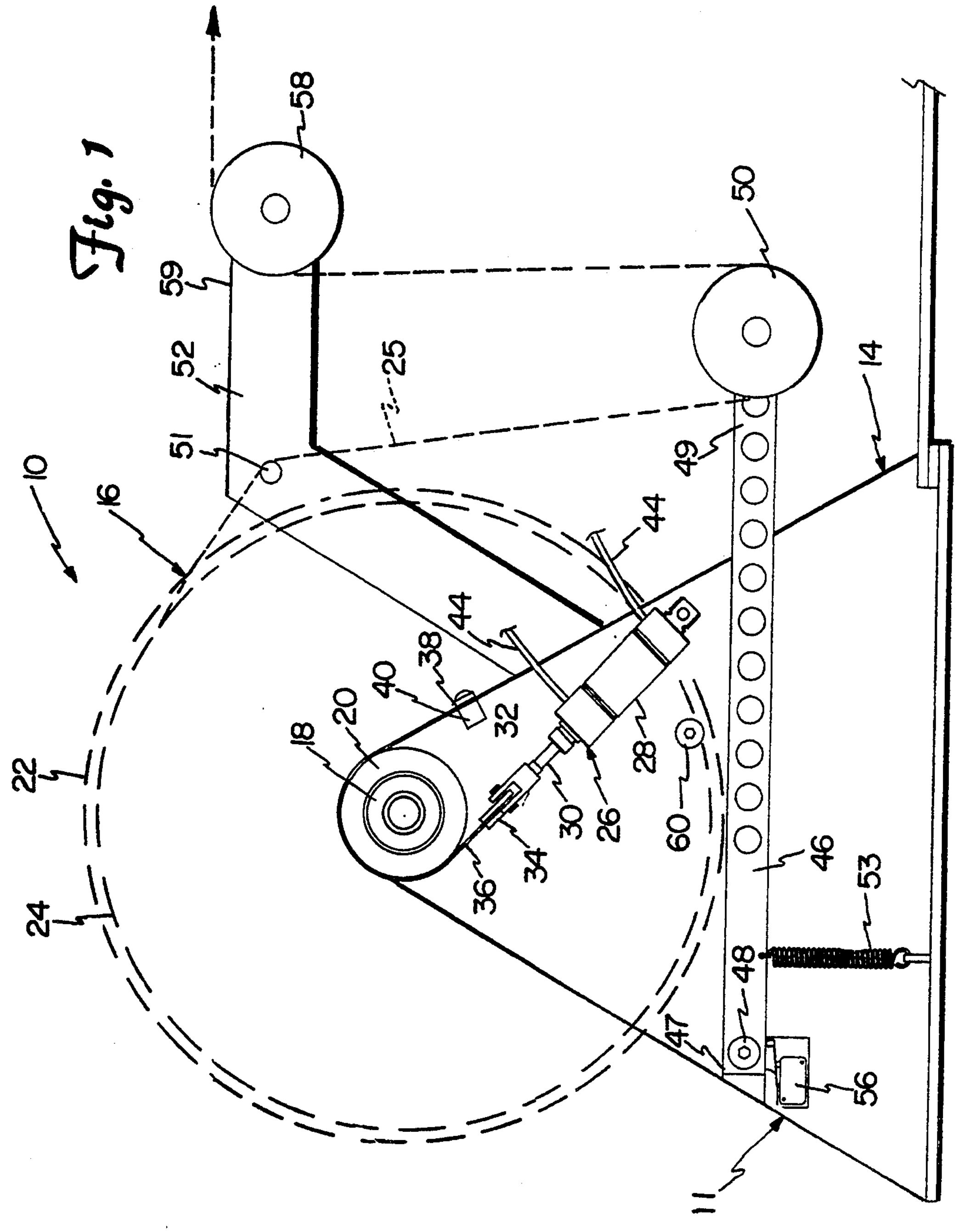
FIG. 1 is a side elevational view showing a first position of components of a payout mechanism forming part of the application apparatus in accordance with the present invention.
Figure 2:
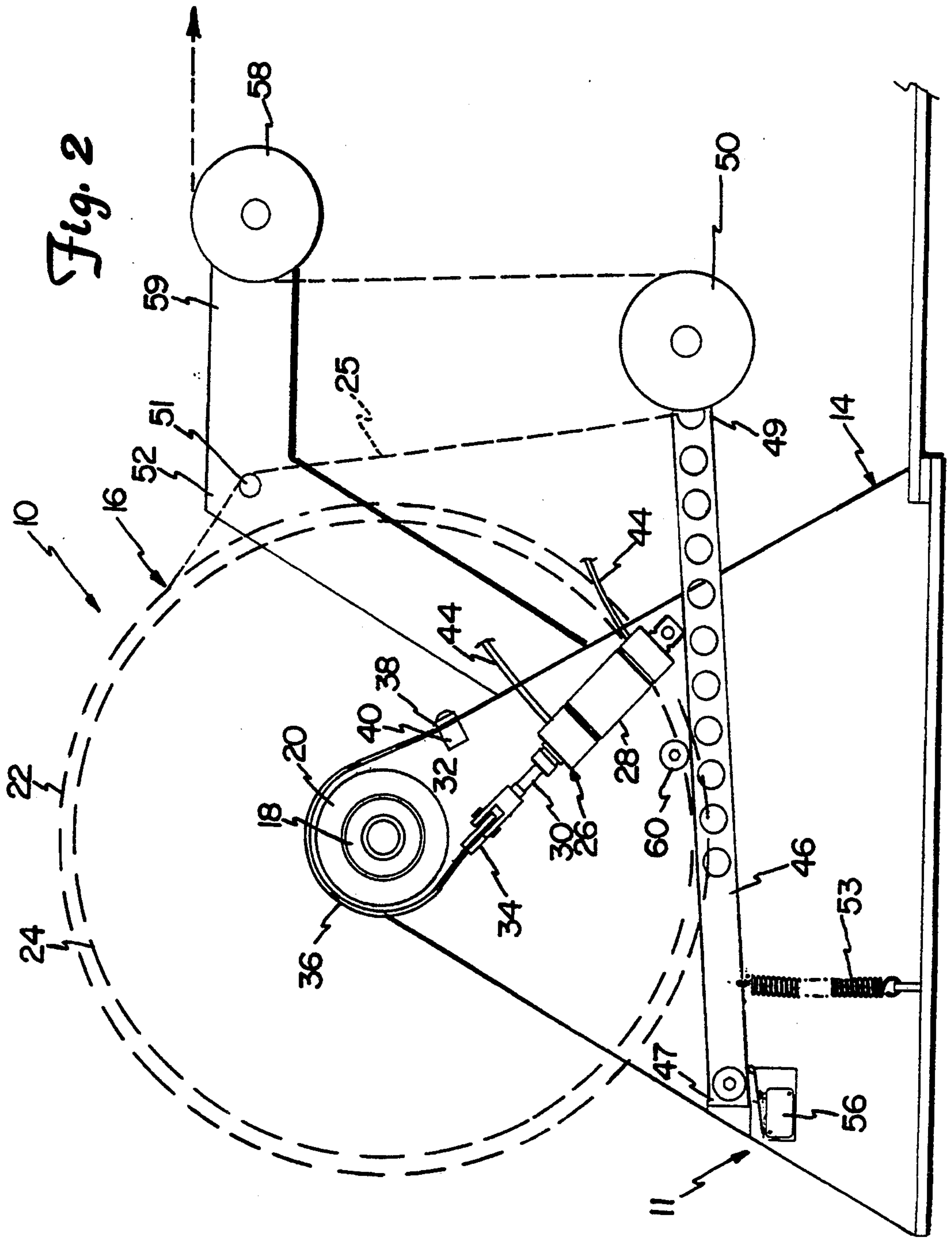
FIG. 2 is a side elevational view similar to FIG. 1 showing a second position of components of the payout mechanism.
Figure 3:
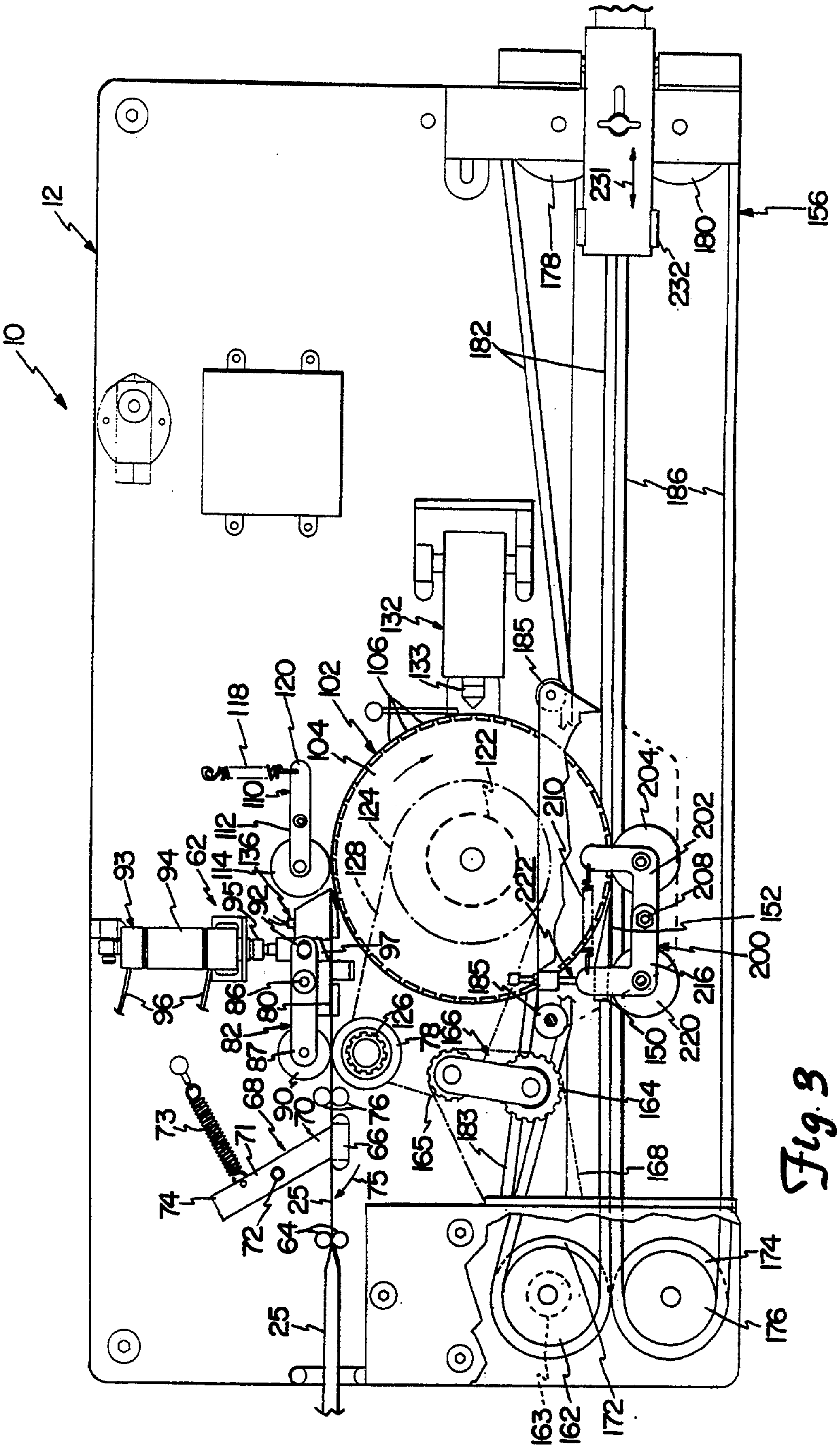
FIG. 3 is a top elevational view of the extracting and cutting mechanism, application mechanism, dispensing mechanism, lamination assembly and conveyor assembly of the application apparatus in accordance with the present invention.

An application apparatus 10 in accordance with the present invention is illustrated generally in FIGS. 1–3. The apparatus 10 includes a frame assembly 11 defined by a primary support frame 12 and a secondary support frame 14. As seen best in FIGS. 1 and 2, the secondary support frame 14 supports a payout assembly 16 including a support shaft 20 supported for free rotation by a bearing 18. The support shaft 20 is configured to removably receive and support payout assembly 16 having a spool 22 which holds a supply 24 of a continuous length of twist-tie material 25.

A brake mechanism 26 forming part of the payout assembly 16 includes pneumatic cylinder 28 having an extensible rod 30. A free end 32 of the extensible rod 30 is secured to a first end 34 of a brake band 36. The brake band 36 extends around the support shaft 20 where a second end 38 of the brake band 36 is fixed to the secondary support frame 14 by a clamp 40. The pneumatic cylinder 28 is connected to a suitable air pressure supply system (not shown) via suitable supply lines 44.

The extensible rod 30 of the brake mechanism 26 is movable between a retracted state (see FIG. 1) and an extended state (see FIG. 2). In the retracted state of the extensible rod 30, the brake band 36 is pulled tight about support shaft 20 to prevent rotation of the support shaft 20 and therewith the spool 22 of payout assembly 16. In the extended state of the extensible rod 30, the brake band 36 is loose about the support shaft 20 which permits the support shaft 20 and therewith the spool 22 of the payout assembly 16 to rotate freely. The retracted and extended states of the extensible rod 30 define released and engaged states, respectively, of the brake mechanism 26.

As seen in FIGS. 1 and 2, the payout mechanism 16 further includes a dancer arm 46 pivotally secured at a first end 47 via a suitable fastener 48 to the secondary support frame 14. A second end 49 of the dancer arm 46 includes a rotatable guide roller 50 over which the continuous length of twist-tie material 25 travels subsequent to passing over a guide pin 51 mounted on an extension arm 52 of the secondary support frame 14. A coiled tension spring 53 is coupled between the secondary support frame 14 and the dancer arm 46. The tension spring 53 acts to bias the dancer arm 46 toward a lowered operating position and against a limit switch 56. The limit switch 56 is mounted to the secondary support frame 14 adjacent the first end 47 of the dancer arm 46. Subsequent to the guide roller 50, the continuous length of twist-tie material 25 travels over a guide roller 58 rotatably mounted at a free end 59 of the extension arm 52.

The dancer arm 46 is movable between a lowered operating position (see FIG. 1) and a raised operating position adjacent an upper movement limiting member 60 (see FIG. 2). Movement of the dancer arm 46 between the lowered and raised operating positions and into and out of contact, respectively, with the limit switch 56, controls movement of the brake mechanism 26 between engaged and released states, respectively.

The dancer arm 46 is moved from its lowered operating position to its raised operating position by an extracting and cutting mechanism 62 (see FIG. 3) which is configured to extract the continuous length of twist-tie material 25 from the supply 24 on spool 22 of payout mechanism 16. The extraction of the twist-tie material 25 raises the dancer arm 46 out of contact with the limit switch 56 which then causes the brake mechanism 26 to move to its released state. With the brake mechanism 26 in the released state, the spool 22 of the payout assembly 16 is free to rotate. Tension spring 53 biases the dancer arm 46 to the lowered operating position which extracts twist-tie material 25 from the spool 22. As the dancer arm 46 moves toward its lowered operating position, the dancer arm 46 once again engages the limit switch 56 causing the brake mechanism 26 to move to its engaged state preventing any further rotation of the spool 22 of payout assembly 16.

Figure 4:
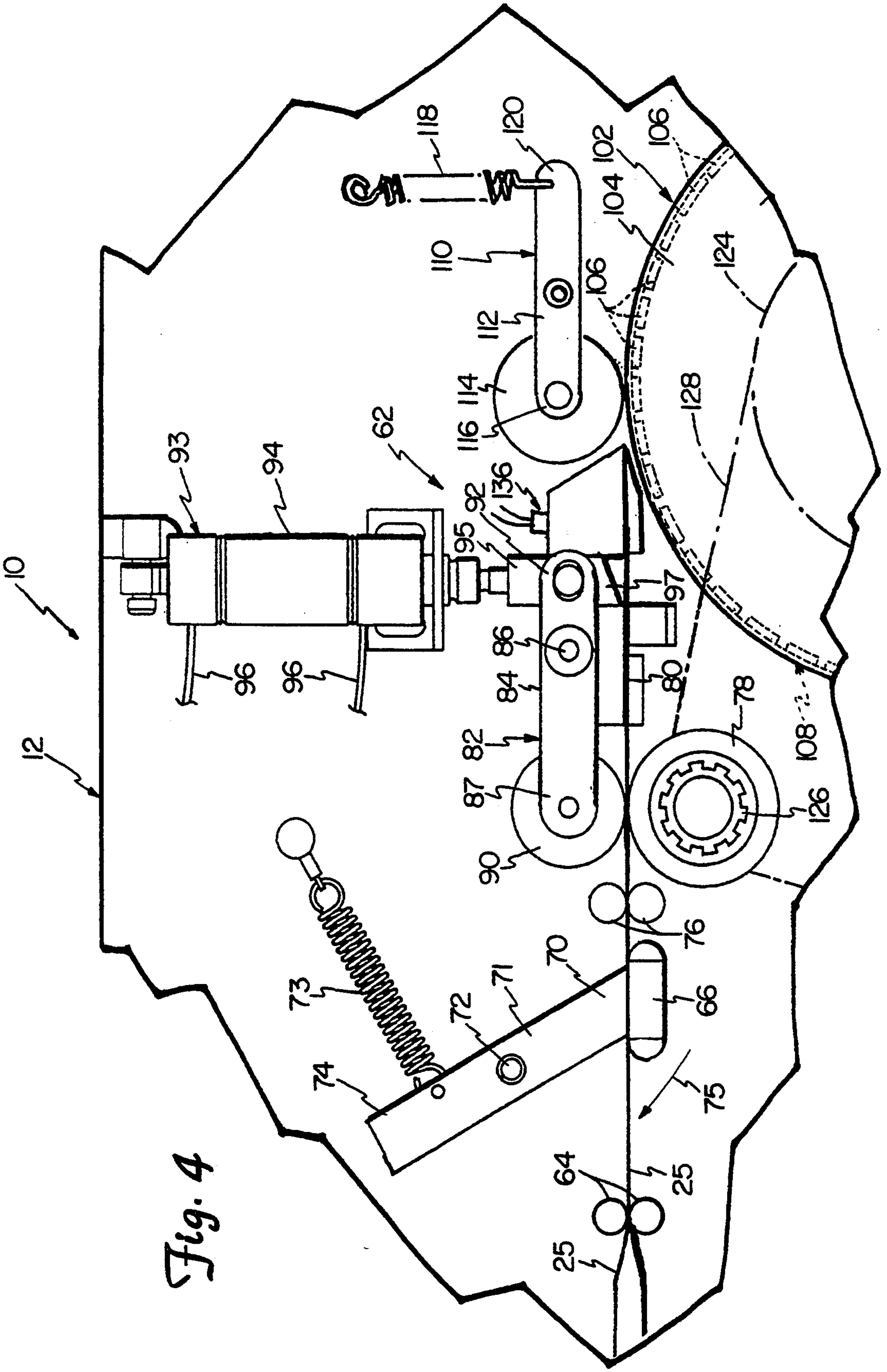
FIG. 4 is an enlarged top elevational view of a first position of the extracting and cutting mechanism shown in FIG. 3.
Figure 5:
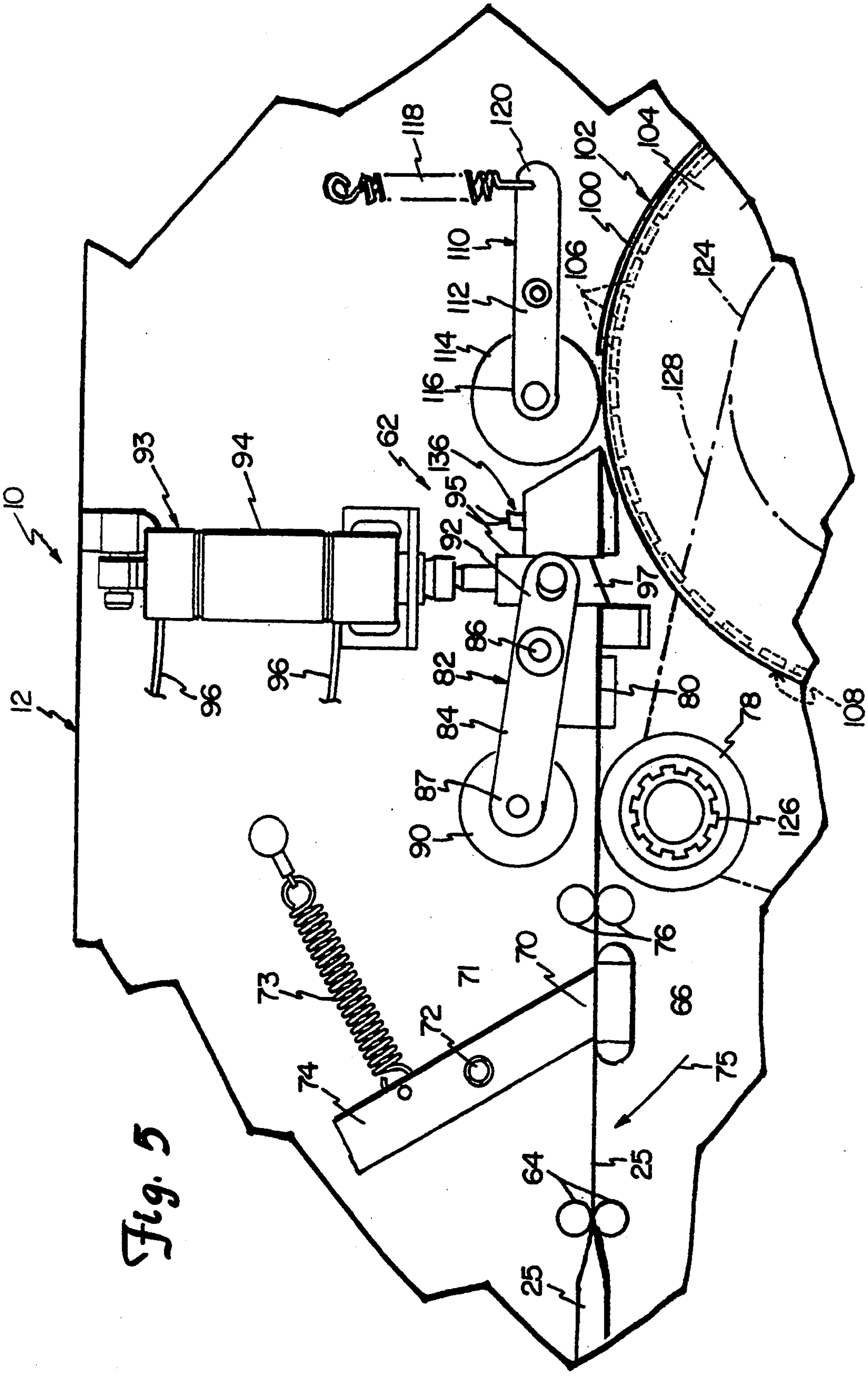
FIG. 5 is an enlarged top elevational view similar to FIG. 4 illustrating a second position of the extracting and cutting mechanism.

As seen in FIGS. 3–5, prior to reaching the cutting and extracting mechanism 62, the twist-tie material 25 passes between a first set of spaced guide pins 64 which re-orient the twist-tie material 25 from a substantially horizontal orientation to a vertical orientation. Subsequent to the guide pins 64, the twist-tie material 25 passes over a brake pad 66 of a brake assembly 68. The brake pad 66 of the brake assembly 68 is secured to the primary support frame 12. A brake lever 71 is pivotally mounted by pin 72 to primary support frame 12. A coiled tension spring 73 is mounted between a second end 74 of the pivotable brake lever 71 and the primary support frame 12. The tension spring 73 biases a first end 70 of the brake lever 71 in a clockwise direction (as represented by directional arrow 75) and against the brake pad 66. Subsequent to passing over the brake pad 66, the twist-tie material 25 passes between a second set of guide pins 76 and then into the extracting and cutting mechanism 62.

As seen best if FIGS. 3-5, the extracting and cutting mechanism 62 includes a powered drive roller 78 over which the twist-tie material 25 travels. The twist-tie material 25 then passes into a guide channel 80 of the extracting and cutting mechanism 62. Mounted to the primary support frame 12 adjacent to the guide channel 80 is a feed arm assembly 82. The feed arm assembly 82 includes a pivotable lever arm 84 pivotally mounted adjacent its median to the primary support frame 12 via a suitable fastener 86. A first end 87 of the pivotable lever arm 84 includes a rotatable feed roller 90. A second end 92 of the pivotable lever arm 84 is coupled to an actuation mechanism 93. The actuation mechanism 93 includes a pneumatic cylinder 94 mounted to the primary support frame 12 and having an extensible rod 95 connected to the second end 92 of the lever arm 84. The pneumatic cylinder 94 is connected to a suitable air pressure supply system (not shown) via suitable supply lines 96. The extensible rod 95 further includes a cutoff knife 97 at its distal end.

The extensible rod 95 of the pneumatic cylinder 94 is moveable between a retracted state shown in FIGS. 3 and 4 and an extended state shown in FIG. 5. In the retracted state of the extensible rod 95, the lever arm 84 is pivoted such that the feed roller 90 is immediately adjacent the drive roller 78 and in contact with the twist-tie material 25 to cause the powered drive roller 78 to extract twist-tie material 25 from the payout mechanism 16. As shown in FIG. 5, in the extended state of the extensible rod 95, the lever arm 84 is pivoted such that the feed roller 90 is spaced from the drive roller 78 so that the driven drive roller 78 extracts no twist-tie material 25 from the payout mechanism 16. In the retracted state of the extensible rod 95, the cutoff knife 97 is in a retracted state spaced from the twist-tie material 25. In the extended state of the extensible rod 95, the cutoff knife 97 is in an extended state, wherein the cutoff knife 97 contacts the twist-tie material 25 to cut off a twist-tie 100 (see FIG. 5) of desired length. In the extended state of the extensible rod 95, when the feed roller 90 is spaced from the drive roller 78, the biasing force effected by the tension spring 73 causes the first end 70, through the pivoting of the brake lever 71, to bear against the brake pad 66 with the twist-tie material 25 therebetween, to prevent the twist-tie material 25 from being withdrawn from the extracting and cutting mechanism 62 by the payout assembly 16.

An application mechanism 102 removes the cut twist-tie 100 from the extracting and cutting mechanism 62. The application mechanism 102 includes a rotatable disc 104 having a plurality of magnetic elements 106 mounted at the base of a shallow channel 108 that extends about a peripheral edge of the rotatable disc 104. The magnetic elements 106 produce a magnetic force, for removing the twist-tie 100 from the extracting and cutting mechanism 62 and holding the twist-tie to the rotatable disc 104. The shallow channel 108 is configured to receive the twist-tie 100 from the cutting and extracting mechanism 62 to properly orient the twist-tie 100 on the disc 104.

A friction roller assembly 110 includes a pivotable lever 112 having a friction roller 114 rotatably mounted at a first end 116 of the lever 112. A tension spring 118 coupled between a second end 120 of the lever 112 and the primary support frame 12 biases the friction roller 114 against the disc 104, to aid the application mechanism 102 in the removal of the twist-tie 100 from the extracting and cutting mechanism 62. The friction roller 114 also insures that the twist-tie 100 is properly seated within the channel 108 against the magnetic elements 106.

The disc 104 is driven by a drive motor 122 which is coupled directly to the disc 104. A pulley 124 mounted to a lower surface of the disc 104 is coupled to a pulley 126 of the drive roller 78 via a drive belt 128 so that the drive roller 78 and disc 104 rotate together in a synchronized manner.

Figure 6:
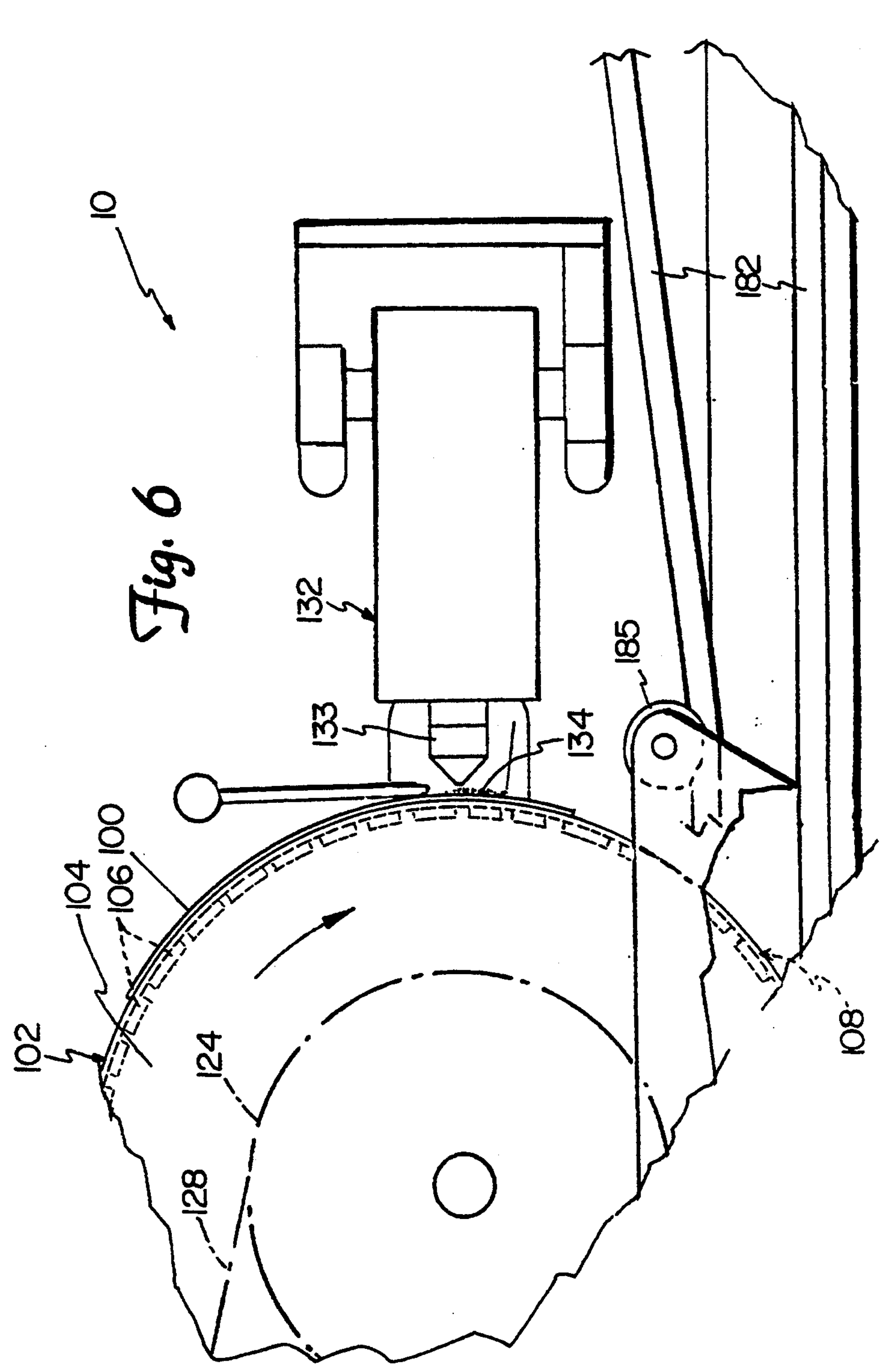
FIG. 6 is an enlarged top elevational view of the hot melt dispensing mechanism shown in FIG. 3.

As seen best in FIGS. 3 and 6, rotation of the disc 104 via the drive motor 122 carries the twist-tie 100 past a dispensing mechanism 132 mounted to the primary support frame 12. The dispensing mechanism 132 includes an extrusion nozzle 133 for dispensing a curable adhesive material 134, such as hot melt glue that cures by cooling, to at least a portion of the twist-tie 100. A sensor 136 mounted adjacent to the cutoff knife 97 senses the presence of the twist-tie 100 on the disc 104, such that in the absence of a twist-tie 100, adhesive material 134 is not applied to the disc 104. The sensor 136 also monitors the length of the twist-tie 100.

Figure 7:
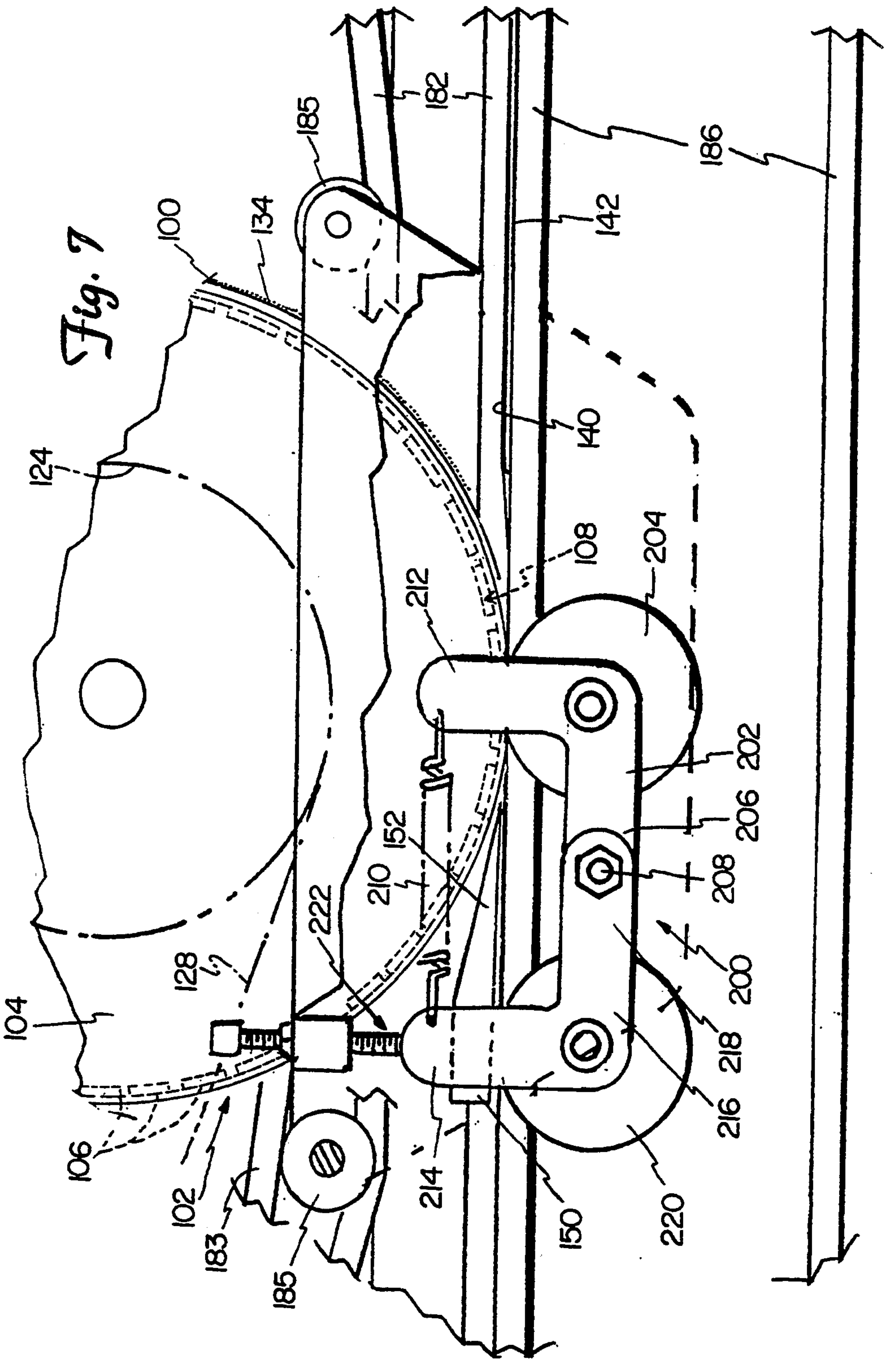
FIG. 7 is an enlarged top elevational view of the lamination assembly shown in FIG. 3.

As seen best in FIGS. 3 and 7, continued rotation of the disc 104 via the drive motor 122 effects application of the twist-tie 100 to a surface 140 of a container 142. A stripper mechanism 150 is mounted to the primary support frame 12. The stripper mechanism 150 includes a blade portion 152 that is configured to ride between the twist-tie 100 and the magnetic elements 106 to remove the twist-tie 100 from the disc 104 for application to the container 142. The adhesive material 134 acts to secure the twist-tie 100 to the surface 140 of the container 142.

Figure 8:
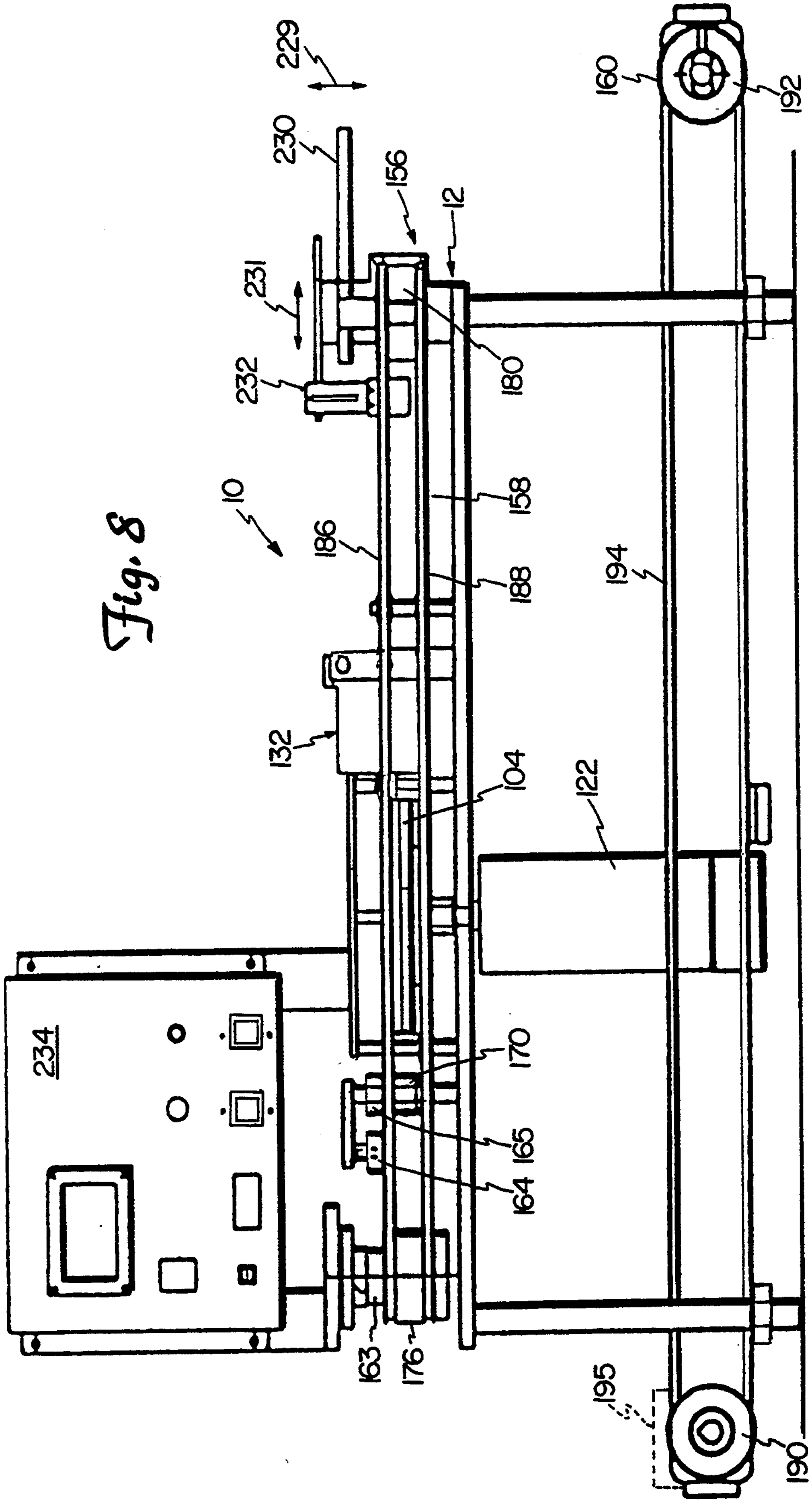
FIG. 8 is a side elevational view of the conveyor assembly of the application apparatus in accordance with the present invention.

As seen best in FIGS. 3 and 8, containers 142 are transported past the disc 104 and the stripper mechanism 150 via a conveyor assembly 156. The conveyor assembly 156 includes a first conveyor mechanism 158 configured to engage an upper edge of a container 142, and a second optional conveyor mechanism 160 configured to support a bottom edge of the container 142.

The first conveyor mechanism 158 includes a primary drive pulley 162 having a pulley 163 coupled to first and second pulleys 164 and 165, respectively, of an intermediate drive assembly 166 via a drive belt 168. A third pulley 170 mounted to the second pulley 165 is engaged by the drive belt 128, such that the primary drive pulley 162 of the first conveyor mechanism 158 is driven by the drive motor 122. A gear 172 of the primary drive pulley 162 engages a gear 174 of a secondary drive pulley 176. Spaced from the primary and secondary drive pulleys 162 and 176 are primary and secondary idler pulleys 178 and 180, respectively. First, upper and lower, continuous, resilient belt members 182 and 183, respectively, extend about the primary drive and idler pulleys 162 and 178 and over secondary idler pulleys 185. Second, upper and lower, continuous, resilient belt members 186 and 188, respectively, extend about the secondary drive and idler pulleys 176 and 180. The second upper and lower belt members 186 and 188 are immediately adjacent the first upper and lower belt members 182 and 183, such that a container 142 is capable of being received and supported between opposed upper and lower belt members to be conveyed relative to the disc 104. Containers 142 are fed between the belt members 182, 183, 186 and 188 by hand.

As seen in FIG. 8, the second optional conveyor mechanism 160 includes a drive roller 190, an idler roller 192 and a conveyor belt 194 extending about the drive and idler rollers 190 and 192. The drive roller 190 is driven through a conveyor motor 195 which is synchronized to main drive motor 122 by way of a microprocessor within control module 234. The second optional conveyor mechanism 160 is particularly useful when applying twist-ties 100 to prefilled containers 142 since the first conveyor mechanism 158 is configured to fully support only empty containers 142.

As seen best in FIGS. 3 and 7, the application apparatus 10 further includes a lamination assembly 200 mounted on the primary support frame 12. The lamination assembly 200 includes a first lever arm 202 having a rotatable lamination roller 204. The first lever arm 202 is pivotably secured at a first end 206 to a suitable post 208. A tension spring 210 is coupled between a second end 212 of the first lever arm 202 and a second end 214 of a second lever arm 216. The second lever arm 216 is pivotally secured at a first end 218 to the post 208. The second lever arm 216 includes a rotatable lamination roller 220. The lamination rollers 204 and 220 act to urge the container 142 and twist-tie 100 applied thereto against a portion of the stripper mechanism 150 and the disc 104 to insure uniform contact between the container 142 and the twist-tie 100. A set screw mechanism 222 can be used to adjust the spacing between the stripper mechanism 150 and lamination roller 220.

As seen best in FIG. 8, the position of the twist-tie 100 from the top edge of a container 142 is determined by a vertically adjustable (as represented by double head directional arrow 229) limit bar 230 which acts to align containers 142 with respect to the first conveyor mechanism 158. A horizontally adjustable (as represented by double head directional arrow 231) sensor 232 determines the positioning of the twist-tie 100 relative to side edges of the container 142. The sensors 136 (FIG. 3) and 232 (FIG. 8), drive motor 122, pneumatic cylinders 28 and 94 and dispensing mechanism 132 are all linked to the microprocessor of control module 234 which controls operation of the various components of the application apparatus 10 in a synchronized manner. Adhesive material 134 length and twist-tie 100 length can be adjusted at the control module 234.

This application apparatus 10 and method of application are relatively uncomplicated. The application apparatus 10 and method allows twist-ties 100 of desired lengths having desired adhesive lengths to be applied to containers 142 of varying sizes quickly and efficiently while insuring alignment accuracy.

Although the present invention has been described with reference to preferred embodiments, workers skilled in the art will recognize that changes may be made in form and detail without departing from the spirit and scope of the invention.

What is claimed is:

1. An apparatus for applying a twist-tie to a surface of a container, comprising:

a frame assembly;

a payout mechanism coupled to the frame assembly, the payout mechanism holding a supply of twist-tie material wherein at least a portion of the twist-tie material is metallic;

means coupled to the frame assembly for extracting a continuous length of twist-tie material from the supply of twist-tie material and for cutting a twist-tie of a desired length from the continuous length of twist-tie material; and a twist-tie applicator including a rotatable disc having a magnetic mechanism that creates a magnetic force for removing the twist-tie from the extracting and cutting means and for holding the full length of the twist-tie stationary relative to the disc as the disc rotates for application of the twist-tie to the surface of the container.

2. The application apparatus of claim 1 wherein the extracting and cutting means includes:

a drive roller coupled to the drive motor, the continuous length of twist-tie material passing over the drive roller; and a feed arm assembly including:

a movable lever arm having a rotatable feed roller; and an actuating means for moving the lever arm between a first position, wherein the feed roller is immediately adjacent the drive roller and in contact with the continuous length of twist-tie material to cause the feed roller to extract twist-tie material from the payout mechanism, and a second position wherein the feed roller is spaced from the drive roller and no extraction of twist-tie material occurs.

3. The application apparatus of claim 2 wherein the feed arm assembly further includes a cutoff knife, and wherein the actuating mechanism moves the cutoff knife between a retracted state wherein the cutoff knife is spaced from the continuous length of twist-tie material, and an extended state wherein the cutoff knife contacts the continuous length of twist-tie material to cutoff the twist-tie of desired length.

4. The application apparatus of claim 3 wherein the retracted state of the cutoff knife corresponds to the first position of the feed roller, and wherein the extended state of the cutoff knife corresponds to the second position of the feed roller.

5. The application apparatus of claim 4 wherein the actuating means includes a pneumatically driven piston/cylinder assembly.

6. The application apparatus of claim 1 and further including:

a dispensing mechanism mounted to the frame assembly adjacent to the rotatable disc, the dispensing mechanism including an extrusion nozzle for selectively dispensing an adhesive material onto at least a portion of the twist-tie, the adhesive material acting to secure the twist-tie to the surface of the container upon the application of the twist-tie to the surface of the container from the rotatable disc.

7. The application apparatus of claim 1 wherein the payout mechanism includes:

a rotatable spool for holding the supply of twist-tie material;

a brake means selectively engageable with the spool, the brake means having a released state wherein the spool is allowed to rotate freely and the continuous supply of twist-tie material can be extracted from supply of twist-tie material on the spool, and an engaged state wherein rotation of the spool is prevented, and the brake means including:

a belt for contacting the spool;

an extensible rod of a piston and cylinder system, the extensible rod having an end connected to the belt wherein the extensible rod is selectively moveable to a first position corresponding to the released state of the brake means and to a second position corresponding to the engaged state of the brake means.

8. The application apparatus of claim 7 wherein the payout mechanism further includes:

a pivotable dancer arm having a guide roller thereon over which the twist-tie material travels, the position of the dancer arm relative to the spool and brake means controlling whether the brake means is in the released state or the engaged state.

9. The application apparatus of claim 2 and further including:

a conveyor assembly mounted on the frame assembly and driven by the drive motor, the conveyor assembly being configured to move a container relative to the rotatable disc for the application of a twist-tie from the rotatable disc to the surface of the container.

10. The application apparatus of claim 9 wherein the conveyor assembly includes:

a first conveyor mechanism configured to engage an upper edge of the container; and a second conveyor mechanism configured to support a bottom edge of the container.

11. The application apparatus of claim 9 wherein the conveyor assembly includes:

a first pair of spaced upper and lower continuous, resilient belt members; and a second pair of spaced upper and lower continuous, resilient belt members, the second upper and lower belt members being immediately adjacent the first upper and lower belt members, such that a container is capable of being received and supported between opposed belt members to be conveyed relative to the rotatable disc.

12. The application apparatus of claim 1 and further including:

a stripper member mounted to the frame assembly adjacent the rotatable disc for separating the twist-tie from the rotatable disc for application to the surface of the container, the stripper member being spaced from a peripheral edge of the rotatable disc and having a single blade portion configured and aligned to separate the twist-tie from the magnetic force holding the twist-tie.

13. The application apparatus of claim 12 and further including a plurality of lamination rollers disposed adjacent the stripper member and the rotatable disc, the rollers acting to urge the container and twist-tie applied thereto against the stripper member and the rotatable disc to insure uniform contact between the container and the twist-tie, each roller being rotatably mounted to one of a plurality of lever arms wherein each respective lever arm has a first end pivotally mounted to the frame assembly and each respective lever arm has a second end connected to a tension spring, the spring connecting the respective lever arms together.

14. The application apparatus of claim 1 wherein the rotatable disc of the twist-tie applicator further includes a peripheral edge defining a channel with a flat base, the channel being configured to receive the twist-tie so that a longitudinal axis of the twist-tie is aligned substantially parallel with a longitudinal axis of the channel and so that the twist-tie is held substantially flat within the channel directly against the base of the channel by the magnetic force of the magnetic mechanism.

15. A method of applying a twist-tie to a surface of a container comprises the steps of:

actuating an extracting and cutting mechanism to extract a continuous length of twist-tie material from a supply of twist-tie material wherein at least a portion of the twist-tie is metallic;

actuating the extracting and cutting mechanism to cut a twist-tie of a desired length from the continuous length of twist-tie material;

rotating a magnetic disc that provides a magnetic force sufficient to remove the twist-tie from the extracting and cutting mechanism and to hold the full length of the twist-tie stationary relative to the magnetic disc as the disc rotates, the disc being configured so that the twist-tie is held substantially flat within and directly against a base of the channel of a peripheral edge of the disc by the magnetic force of the disc and configured so that a longitudinal axis of the twist-fie is aligned substantially parallel with a longitudinal axis of the channel of the peripheral edge Of the disc;

applying a quantity of adhesive material to at least a portion of the twist-tie; and further rotating the magnetic disc to apply the twist-tie to a surface of a container.

16. The method of claim 15 wherein the container is a multiple serving, recloseable, flexible packaging container.

17. An apparatus for applying a twist-fie to a surface of a container, the twist-tie of the type being substantially made of a nonmetallic material and having at least one metallic rib extending the length of the twist-tie, the apparatus comprising:

a frame assembly;

a payout mechanism coupled to the frame assembly, the payout mechanism holding a supply of twist-tie material;

means coupled to the frame assembly for extracting a continuous length of twist-tie material from the supply of twist-tie material and for cutting a twist-tie of a desired length from the continuous length of twist-tie material; and a twist-tie applicator for receiving the twist-tie from the extracting and cutting means and for properly orienting the twist-tie so that the twist-tie can be applied to the surface of the container in a desired aligned orientation relative to the container, the twist-tie applicator including:

a rotatable disc including a peripheral edge having a channel, the channel having a flat base and being configured so that the twist-tie can lie substantially flat against the base of the channel within the channel with a longitudinal axis of the twist-tie aligned substantially parallel with the longitudinal axis of the channel; and a plurality of magnetic elements mounted on the peripheral edge of the rotatable disc to form a substantially continuous extent of magnetic elements about the peripheral edge, the magnetic elements providing a magnetic force to hold the twist-tie directly against and stationary relative to the flat base of the channel of the disc as the disc rotates.

18. The apparatus of claim 17 and further including:

a dispensing mechanism mounted to the frame assembly adjacent the rotatable disc, the dispensing mechanism including an extrusion nozzle for dispensing an adhesive onto at least a portion of the twist-tie.

19. An apparatus for applying a twist-tie to a surface of a container, the twist-tie of the type being substantially made of a nonmetallic material and having at least one metallic rib extending the length of the twist-tie, the apparatus comprising:

a frame assembly;

a drive motor mounted on the frame assembly;

a payout mechanism coupled to the frame assembly, the payout mechanism including:

a rotatable spool for holding a supply of twist-tie material;

a brake means selectively engageable with the spool, the brake means having a released state wherein the spool is allowed to rotate freely and the continuous supply of twist-tie material can be extracted state wherein rotaton of the spool is prevented;

means coupled to the frame assembly for extracting a continous length of twist-tie tie material from the supply of twist-tie material and for cutting a twist-tie of a desired length from the continuous length of twist-tie material, the extracting and cutting means including:

a drive roller coupled to the drive motor, the continuous length of twist-tie material passing over the drive roller; and a feed arm assembly including:

a movable lever arm having a rotatable feed roller; and an actuating means for moving the lever arm between a first position, wherein the feed roller is immediately adjacent the drive roller and in contact with the continuous length of twist-tie material to cause the feed roller to extract twist-tie material from the payout mechanism, and a second position wherein the feed roller is spaced from the drive roller and no extraction of twist-tie material occurs;

a twist-tie applicator for receiving the twist-tie from the extracting and cutting means and for properly orienting the twist-tie so that the twist-tie can be applied to the surface of the container in a desired aligned orientation relative to the container, the twist-tie applicator including:

a rotatable disc having a magnetic mechanism that creates a magnetic force for removing the twist-tie from the extracting and cutting means and for holding the twist-tie stationary relative to the rotatable disc as the disc rotates for application of the twist-tie to the surface of the container, the rotatable disc having a peripheral edge defining a channel with a flat base, the channel being configured to receive the twist-tie so that a longitudinal axis of the twist-tie is aligned substantially parallel with a longitudinal axis of the channel and so that the twist-tie is held substantially flat within the channel directly against the base of the channel by the magnetic force of the magnetic mechanism; and a dispensing mechanism mounted to the frame assembly adjacent the rotatable disc, the dispensing mechanism including an extrusion nozzle for selectively dispensing an adhesive onto at least a portion of the twist-tie, the adhesive material acting to secure the twist-tie to the surface of the container upon the application of the twist-tie to the surface of the container from the rotatable disc;

a stripper member mounted on the frame assembly adjacent the rotatable disc for separating the twist-tie from the rotatable disc for application to the surface of the container, the stripper member being spaced from the peripheral edge of the rotatable disc; and a plurality of lamination rollers supported on the frame assembly adjacent the stripper member and the rotatable disc that act to urge the container and the twist-tie applied thereto against a portion of the stripper member to insure uniform contact between the surface of the container and the twist-tie.

20. An apparatus for applying a twist-tie to a surface of a container, comprising:

a frame assembly;

a payout mechanism coupled to the frame assembly, the payout mechanism holding a supply of twist-tie material wherein at least a portion of the twist-tie material is metallic;

means coupled to the frame assembly for extracting a continuous length of twist-tie material from the supply of twist-fie material and for cutting a twist-tie of a desired length from the continuous length of twist-tie material; and a twist-tie applicator including a rotatable disc having a magnetic mechanism that creates a magnetic force for removing the twist-tie from the extracting and cutting means and for holding the twist-tie stationary relative to the disc as the disc rotates for application of the twist-tie to the surface of the container, the rotatable disc having a peripheral edge defining a flat base, the base being arranged and disposed to receive the twist-tie so that a longitudinal axis of the twist-tie is aligned substantially parallel with a longitudinal axis of the channel and so that the twist-tie is held substantially flat directly against the base by the magnetic force of the magnetic mechanism.

* * * * *

UNITED STATES PATENT AND TRADEMARK OFFICE

CERTIFICATE OF CORRECTION

PATENT NO. : 5,389,190

DATED : February 14, 1995

INVENTOR(S) : Brian D. Larsen, James A. Beckman, Stan W. Drietz, Scott L. Nelson, Mike P. Feltman, Gary L. Lowe It is certified that error appears in the above-indentified patent and that said Letters Patent is hereby corrected as shown below:

Col. 1, lines 6-8, delete "Priority of the prior application is claimed pursuant to 35 U.S.C. § 120."

Col. 5, line 3, delete "if", insert --in--

Col. 10, line 19, delete "Of", insert --of--

Col. 11, line 16, after "extracted", insert --from the supply of twist-tie material on the spool, and an engaged--

Col. 12, line 35, delete "twist-fie", insert --twist-tie--

Signed and Sealed this

Twentieth Day of June, 1995

*Attest:*

BRUCE LEHMAN

*Attesting Officer* *Commissioner of Patents and Trademarks*